(12) United States Patent
Junuzovic et al.

(10) Patent No.: US 12,267,620 B2
(45) Date of Patent: *Apr. 1, 2025

(54) INTERACTIVE AND SHARED SURFACES

(71) Applicant: Microsoft Technology Licensing, LLC, Redmond, WA (US)

(72) Inventors: Sasa Junuzovic, Kirkland, WA (US); William Thomas Blank, Bellevue, WA (US); Bruce Arnold Cleary, III, Marysville, WA (US); Anoop Gupta, Woodinville, WA (US); Andrew D. Wilson, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/969,907

(22) Filed: Oct. 20, 2022

(65) Prior Publication Data
US 2023/0045386 A1    Feb. 9, 2023

Related U.S. Application Data

(63) Continuation of application No. 15/380,690, filed on Dec. 15, 2016, now Pat. No. 11,509,861, which is a (Continued)

(51) Int. Cl.
*H04N 11/02*    (2006.01)
*G06F 3/01*    (2006.01)
(Continued)

(52) U.S. Cl.
CPC ............. *H04N 7/142* (2013.01); *G06F 3/017* (2013.01); *G06F 3/0425* (2013.01);
(Continued)

(58) Field of Classification Search
CPC ...................................................... H04N 7/142
(Continued)

(56) References Cited

U.S. PATENT DOCUMENTS

2002/0051491 A1* 5/2002 Challapali ............ H04N 19/597
                                                      348/E13.071
2002/0180726 A1* 12/2002 Shi ........................ H04N 7/142
                                                      348/E7.079
(Continued)

*Primary Examiner* — Leron Beck

(57) ABSTRACT

The interactive and shared surface technique described herein employs hardware that can project on any surface, capture color video of that surface, and get depth information of and above the surface while preventing visual feedback (also known as video feedback, video echo, or visual echo). The technique provides N-way sharing of a surface using video compositing. It also provides for automatic calibration of hardware components, including calibration of any projector, RGB camera, depth camera and any microphones employed by the technique. The technique provides object manipulation with physical, visual, audio, and hover gestures and interaction between digital objects displayed on the surface and physical objects placed on or above the surface. It can capture and scan the surface in a manner that captures or scans exactly what the user sees, which includes both local and remote objects, drawings, annotations, hands, and so forth.

20 Claims, 10 Drawing Sheets

Related U.S. Application Data continuation of application No. 13/160,094, filed on Jun. 14, 2011, now Pat. No. 9,560,314.

(51) Int. Cl.
  *G06F 3/042* (2006.01)
  *G06F 3/14* (2006.01)
  *G06Q 10/101* (2023.01)
  *H04N 7/14* (2006.01)
  *H04N 7/15* (2006.01)
  *G01B 11/24* (2006.01)

(52) U.S. Cl.
  CPC ......... *G06F 3/1454* (2013.01); *G06Q 10/101* (2013.01); *H04N 7/15* (2013.01); *G01B 11/24* (2013.01)

(58) Field of Classification Search
  USPC ........................................ 375/240.01–240.29
  See application file for complete search history.

(56) References Cited

U.S. PATENT DOCUMENTS

| | | | |
|---|---|---|---|
| 2003/0052962 A1* | 3/2003 | Wilk | H04N 7/142 348/E7.079 |
| 2005/0089194 A1* | 4/2005 | Bell | G06T 7/194 382/173 |
| 2006/0101054 A1* | 5/2006 | Dempski | G06F 9/542 707/999.102 |
| 2008/0068443 A1* | 3/2008 | Thielman | H04N 7/15 348/E7.083 |
| 2008/0077953 A1* | 3/2008 | Fernandez | H04N 7/18 725/32 |
| 2008/0158340 A1* | 7/2008 | Shibata | H04N 7/144 348/14.16 |
| 2010/0188557 A1* | 7/2010 | Tan | G06F 3/0425 348/744 |
| 2011/0154266 A1* | 6/2011 | Friend | G09B 19/00 715/863 |
| 2012/0188637 A1* | 7/2012 | Joseph | G02B 30/52 359/478 |

\* cited by examiner

INTERACTIVE AND SHARED SURFACES

CROSS-REFERENCE TO RELATED APPLICATIONS

This application is a continuation application of U.S. patent application Ser. No. 15/380,690, filed on Dec. 15, 2016, which is a continuation application of U.S. patent application Ser. No. 13/160,094, filed on Jun. 14, 2011, now U.S. Pat. No. 9,560,314, entitled "INTERACTIVE AND SHARED SURFACES", the entire disclosures of all are hereby incorporated by reference.

BACKGROUND

It is currently difficult for remote collaborators to work together in full color on arbitrary surfaces in a natural way. For instance, remote collaborators cannot easily share a physical document (e.g., a blank paper, magazine, architectural diagram) or a whiteboard, draw on it, annotate it, and see each other as they perform these actions (e.g., point, gesture, circle, and so forth). While some technologies for collaboration exist (e.g., tablet PCs, slates, instrumented surfaces, and digital surfaces with dedicated embedded cameras), they often require specialized and instrumented surfaces.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The interactive and shared surface technique described herein employs hardware that can project on any surface, capture video of that surface and objects on or above it, and get depth information of and above the surface while preventing visual feedback (also known as video feedback, video echo, or visual echo). In one embodiment this hardware is a simple, low-cost, small, and light lamp-like fixture that consists of a projector, a red, green, blue (RGB) color camera, a depth camera, and possibly a microphone or microphone array. The technique makes any surface, and objects on or above the surface, including hands, interactive and shared. The technique provides N-way sharing of a surface using video compositing. It also provides for automatic calibration of hardware components, including calibration of any projector, RGB camera, and depth camera employed by the technique.

More specifically, in one embodiment, the interactive surface sharing technique described herein operates as follows. For a local location, video of the surface and objects above or on the local surface at the local location are captured with a corresponding RGB camera and a depth camera. The foreground video of the local surface captured by the RGB camera is sent to one or more remote locations which project the received video of the foreground onto the remote surface at their location. Video of the remote surfaces is captured at each remote location with a corresponding RGB camera and a depth camera. The foreground video of the RGB camera captured at the remote locations can then be sent to the local location (and optionally other remote locations), where it is projected onto the surface at that location. Visual echo of the projections from other locations is removed before transmitting the video of the local surface to remote locations and vice-versa.

A user can use physical, visual, audio, and hover gestures to manipulate (a) physical objects placed on or above the local surface, (b) digital objects shown on the local surface; and (c) objects in the video of the remote surface.

DESCRIPTION OF THE DRAWINGS

The specific features, aspects, and advantages of the disclosure will become better understood with regard to the following description, appended claims, and accompanying drawings where:

DETAILED DESCRIPTION

In the following description of the interactive and shared surface technique, reference is made to the accompanying drawings, which form a part thereof, and which show by way of illustration examples by which the interactive and shared surface technique described herein may be practiced. It is to be understood that other embodiments may be utilized and structural changes may be made without departing from the scope of the claimed subject matter.

1.0 Interactive and Shared Surface Technique

The interactive and shared surface technique supports two-way collaborations, multi-way collaborations, and single-user interactions with both physical and digital objects using both physical and digital interactions.

The following sections provide exemplary architectures and exemplary processes for practicing the technique described herein, as well as an exemplary scenario of how the technique can be used. Details of various collaborative and single-user embodiments of the technique follow.

1.2 Exemplary Architecture

Figure 1:
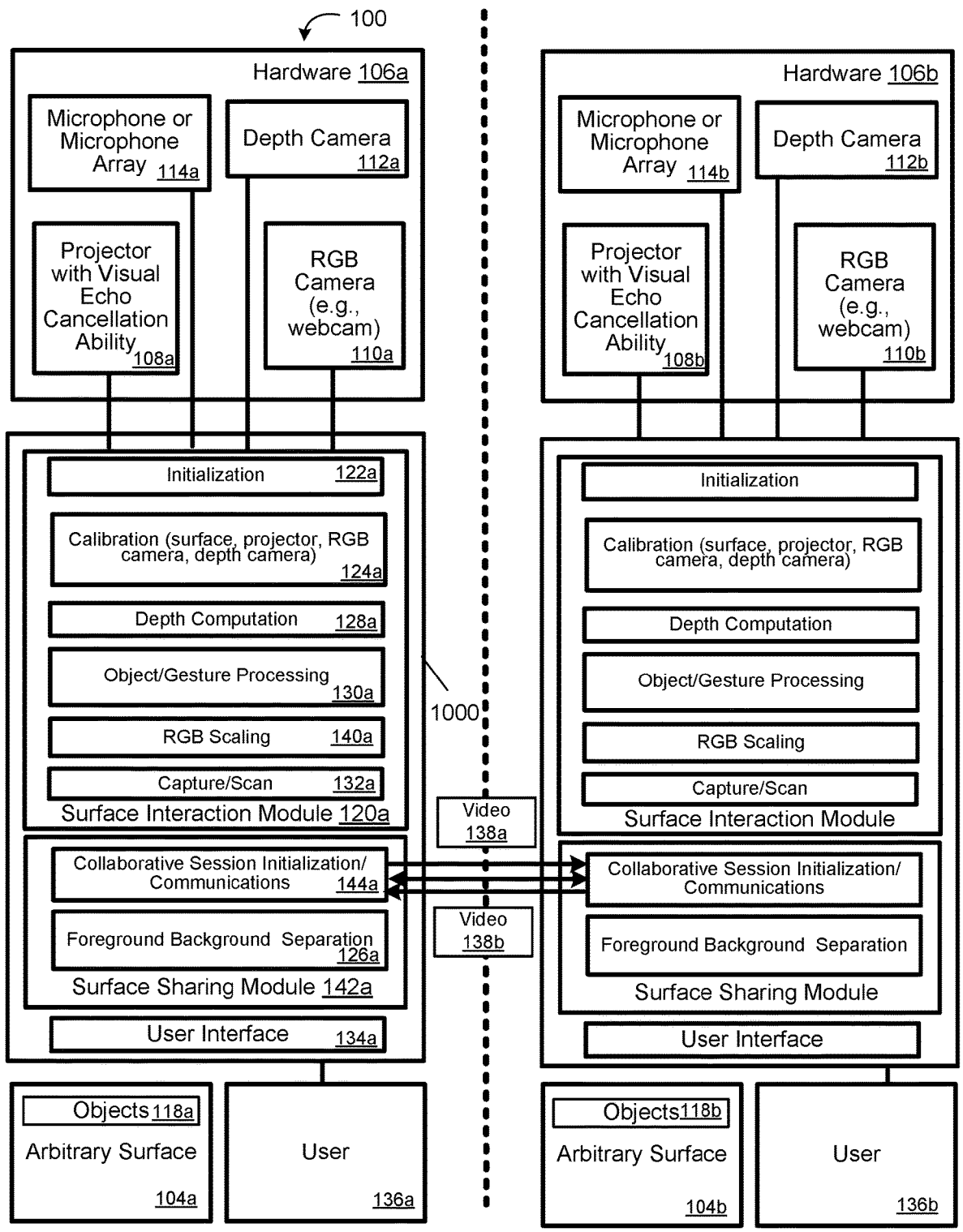
FIG. 1 is an exemplary architecture for practicing one exemplary embodiment of the interactive and shared surface technique described herein when used in a collaborative scenario.
Figure 2:
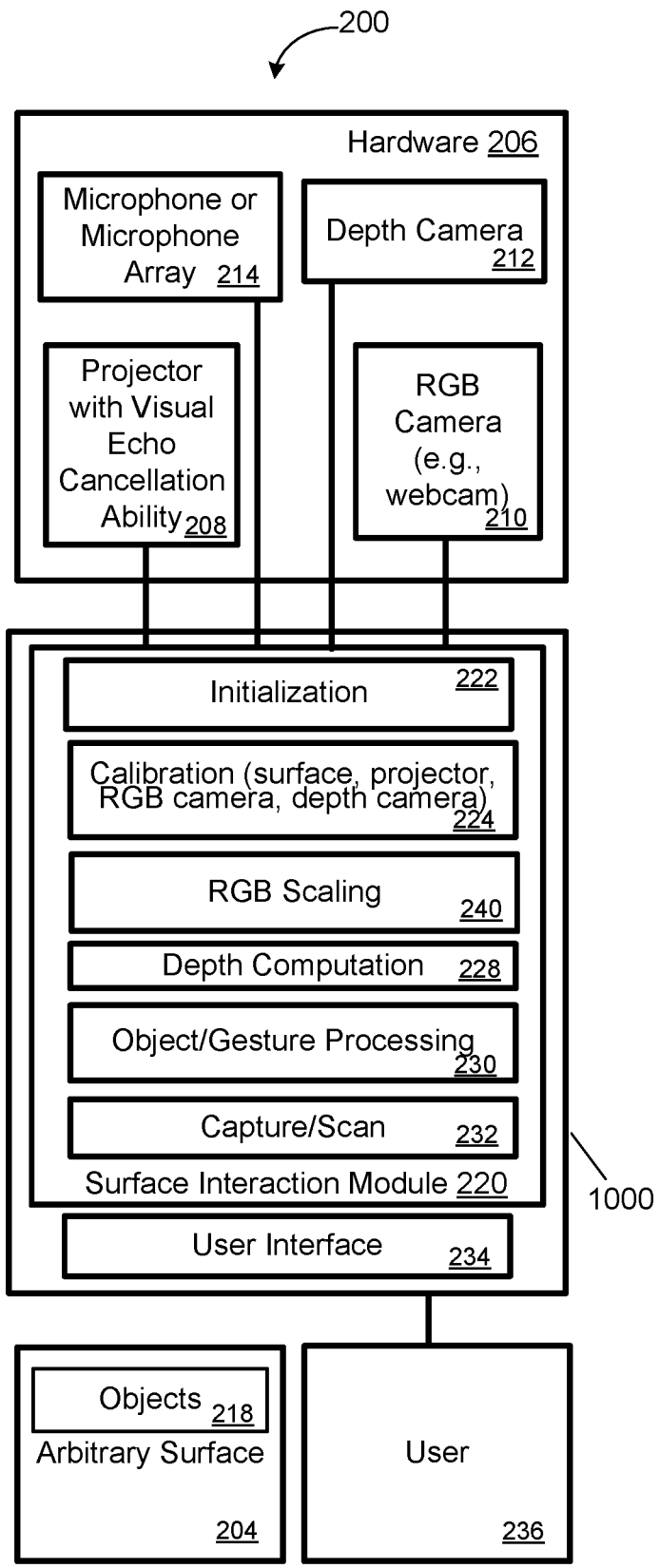
FIG. 2 is an exemplary architecture for practicing one exemplary embodiment of the interactive and shared surface technique described herein when used in a single user scenario.

The interactive and shared surface technique can operate in a collaborative or in a standalone configuration, as shown in FIGS. 1 and 2, respectively, and described in more detail below.

FIG. 1 shows an exemplary architecture 100 for practicing one embodiment of the interactive and shared surface technique in a collaborative environment. As shown if FIG. 1, the exemplary architecture 100 allows any arbitrary surface to become interactive and shared. The surface need not be instrumented and need not have a specific orientation (e.g., the surface could be oriented horizontally or vertically). For example, a whiteboard, a table top or a wall can equally well be used with the technique.

At a local location 102, the interactive and shared surface technique captures an arbitrary surface 104a with a set of hardware 106a that can project on any surface, capture video of that surface, and get depth information of and above the surface while preventing visual feedback (also known as video feedback, video echo, or visual echo). In one embodiment this hardware 106a is a simple, low-cost, small, and light lamp-like fixture that consists of a projector 108a, a RGB camera 110a, a depth camera 112a, and possibly a microphone or a microphone array 114a. Typically, the same or similar hardware is employed at one or more remote locations 116.

The RGB camera 110a is used for capturing color video of the surface 104a and objects on or above the surface. The foreground of the color video is separated from the background of the video and is typically sent to one or more remote locations so that it can be projected on to a remote arbitrary surface.

Video from the depth camera 112a is simultaneously captured with the color video from the RGB camera 110a. The depth camera 112a can be used for various purposes. For example, the depth camera can be used to determine the location of a user's hand relative to a corresponding surface at a location. The hand location determined from the depth camera can be used to manipulate a projected object, or to activate controls projected on the surface, by touch or gesture. The depth camera 112a can also be used to determine large changes in the location of a surface 104a. For example, if the depth camera detects a sudden change in surface depth characteristics, then recalibration of the RGB camera, a corresponding projector and a corresponding depth camera takes place, as will be described in more detail below. The depth camera also provides for automatic computation of a new projection (correction) matrix when these changes occur.

The projector is used to project the color video received. In one embodiment the projector is synchronized with the RGB camera to project received video from another location, but turns off the projection momentarily when the RGB camera is capturing the color video of the surface at the same location. This has the effect of cancelling out the visual echo that would occur if the RGB camera would capture both the local surface and the projected video of a remote surface and transmit it back to the remote participant.

At each location the architecture 100 includes a surface interaction module 120a and a surface sharing module 142a that reside on a general purpose computing device 1000 such as will be described in greater detail with respect to FIG. 10. In one embodiment the local surface interaction module 120a has an initialization module 122a that initializes the architecture 100 at a given location.

The surface interaction module 120a also includes a calibration module 124a which calibrates the depth camera 112a, the RGB camera 110a, and the projector 108a. A more detailed description of these calibrations will be provided later.

A depth computation module 128a of the surface interaction module 120a computes the depth of objects 118a on or above the surface 104a. It also computes the orientation of the surface. If this module determines large depth changes during run time, such as would occur if the projector was changed to project on a horizontal surface instead of a vertical surface, the projector 108a, RGB camera 110a, and depth camera 112a are recalibrated.

An object/gesture processing module 130a of the surface interaction module 120a performs processing to support user/object/surface interactions. For example, this module 130a can analyze and interpret gestures made by a user 136a (such as, for example, hover and touch gestures), and can translate these gestures into various commands to manipulate and interact with actual, projected and digital objects. Additionally, this module 130a can optionally process audio gestures/commands captured by the microphone 114a to control the system or objects on the surface. The architecture 100 can also include a user interface 134a to allow a user 136a to enter commands to control and initialize it.

In one embodiment a RGB scaling module 140a operates to scale colors of the pixels of the captured color video. RGB scaling, or white-balancing, can be performed in a variety of known ways and will be discussed in greater detail later.

The architecture 100 can also capture and scan a surface in a manner that captures or scans exactly what the user sees, which includes both local and remote objects, drawings, annotations, hands, and so forth. To this end, the surface interaction module 120a can also include a capture module 132a that can capture and memorialize the surface 104a, projected and actual objects 118a on the surface, annotations, the hands of a user and so forth.

The surface sharing module 142a includes a collaborative session initialization and communications module 144a. Part of the initialization process for collaborating includes establishing communications between the local and remote locations using this module 144a. The collaborative session initialization and communications module 144a is also responsible for determining the initial state of the surface 120a, which is later used in determining the foreground and background of the color video of the surface. The surface sharing module 142a thus further includes a foreground and background separation module 126a which separates the foreground from the background of the color video captured by the RGB camera. A more detailed discussion of this processing will also be provided later.

One embodiment of the surface sharing architecture operates as follows. For the local location 102, video of the surface 104a and objects 118a above or on the surface 104a are captured with a RGB camera 110a and the depth camera 112a. The foreground video 138a captured by the RGB camera 110a (and optionally video captured by the depth camera) is sent to one or more other remote locations 116 which project the received RGB video onto the surface 102b. Video 138b of their surfaces is captured with their RGB camera 112b and depth camera 112b. The foreground video 138b of the RGB camera 110b (and optionally video captured by the depth camera), is sent to the local location 102 and optionally other remote locations where the foreground video is projected onto the surface at that location. Visual echo of the projections from other locations are removed before transmitting the local video to remote locations and vise-versa.

A user at each location 102, 116 can view the projected video from one or more other locations on their surface and can also manipulate projected objects with physical, visual, audio, and hover gestures. A user can also interact with objects projected on the surface (including those that are not received from a remote surface, such as, for example, an electronic slide that is projected on the surface) and physical objects placed on or above the surface.

FIG. 2 shows an exemplary architecture 200 for practicing one embodiment of the interactive and shared surface technique in a stand-alone configuration. As shown if FIG. 2, the surface 204 used need not be instrumented and need not have a specific orientation.

The interactive and shared surface technique captures the arbitrary surface 204 with a set of hardware 206 that can project on any surface, capture video of that surface, and get depth information of and above the surface while preventing visual feedback.

In one embodiment this hardware 206 is a simple, low-cost, small, and light lamp-like fixture that consists of a projector 208, a RGB camera 210, and a depth camera 212, and possibly a microphone or a microphone array 214. The RGB camera 210 is used to capture color video of the surface 204 and objects on or above the surface. Video from the depth camera 212 is simultaneously captured with the color video from the RGB camera 210. The depth camera 212 can be used for various purposes, e.g., determining a user's hand relative to a corresponding surface at that location and determining large changes in the location of a surface 204 as discussed above in the collorative scenario. The projector 208 is used to project the color video.

Similar to the architecture 100 described with respect to FIG. 1, the architecture 200 employs a surface interaction module 220 that resides on a general purpose computing device 1000. The surface interaction module 220 has an initialization module 222 that initializes the components of the architecture 200. The surface interaction module 220 also includes a calibration module 224 which calibrates the depth camera 212, the RGB camera 210, and the projector 208. A more detailed description of these calibrations will be provided later.

The surface interaction module 220 further includes a depth computation module 228 that computes the depth of objects 218 on or above the surface 204. It also computes the orientation of the surface. As previously described with respect to the collaborative configuration of FIG. 1, if this module determines large depth changes during run time, such as would occur if the projector was changed to project on a horizontal surface instead of a vertical surface, the projector 208a, the RGB camera 210, and the depth camera 212 are recalibrated.

An object/gesture processing module 230 of the surface interaction module 220 performs processing to support user/object/surface interactions. For example, this module 230 can analyze and interpret gestures and sounds made by a user 236 (such as, for example, hover and touch gestures), and can translate these gestures into various commands to manipulate and interact with actual, digital and projected objects on or above the surface.

In one embodiment a RGB scaling module 240 of the surface interaction module 220 operates to scale colors of the captured and projected video.

The architecture 200 can also include a user interface 234 to allow a user 236a to enter commands to control and initialize it.

The exemplary architecture 200 described in FIG. 2 can capture and scan an arbitrary surface 204 in a manner that captures exactly what the user sees. To this end, the surface interaction module 220 can also include a capture module 232 that can capture and memorialize the surface 204, projected, digital and actual objects 218 on the surface, annotations, the hands of a user 236 and so forth. For example, the RGB camera 210 and the depth camera 212 can be used to capture an image of a user 236 placing a document on an arbitrary surface 204 and annotating the document. This captured image of the annotated document can then be saved or transmitted to another location. A gesture by the user 236 can be determined by the object and gesture processing module 230 to capture the annotation on the projected document; and in response to the captured gesture, the user's annotation to the projected document on the surface 204 can be captured by the RGB camera 210 to create a new electronic document containing the captured image of the document with the user's annotations superimposed thereon.

1.3 Exemplary Processes for Practicing the Technique

Figure 3:
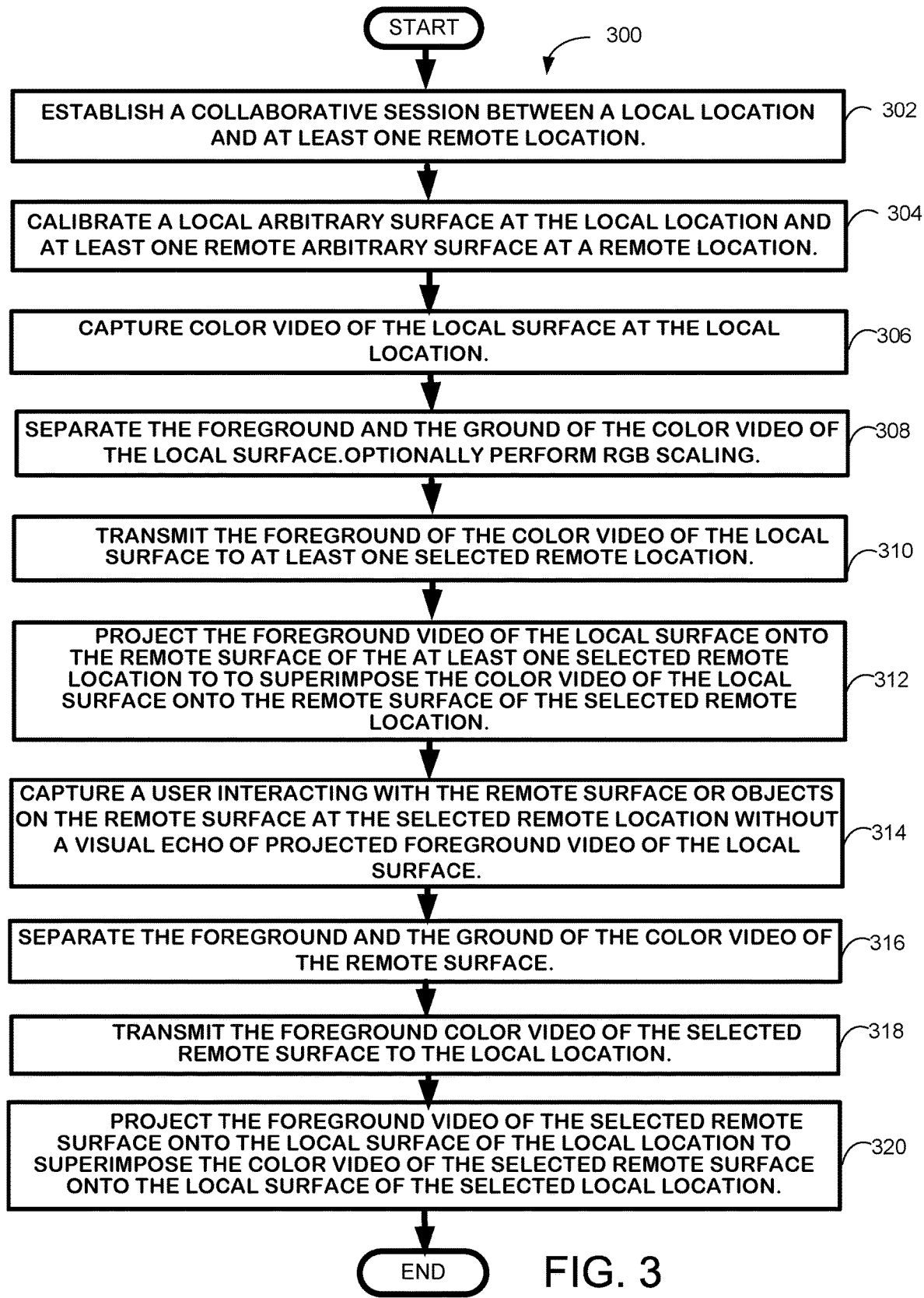
FIG. 3 depicts a flow diagram of an exemplary process for employing one embodiment of the interactive and shared surface technique described herein.

FIG. 3 shows an exemplary process 300 for practicing one embodiment of the interactive and shared surface technique in a collaborative environment. As shown in FIG. 3, block 302 a collaborative session is established between a local location and at least one remote location. Typically this collaborative session takes place over a network, such as, for example, the Internet or a local network. During establishment of the collaborative session, communications and user parameters are established in a manner similar to establishing a video call. For example, for a two-way case, one user invites another user to join. The other user has to accept the call; otherwise, the session is not established. In one embodiment, in addition to performing the actions to establish the communications between locations, the technique automatically shows the video of surface from the remote user on the local projector and vice versa. In one embodiment, the technique also makes these videos full screen windows without boundaries, which helps to create an illusion that the local surface is a portal to the remote surface.

Once the collaborative session has been established between the participating locations, a local arbitrary surface at the local location and at least one remote arbitrary surface at a remote location are calibrated, as shown in block 304. In one embodiment of the technique, calibration includes taking color video of the surface at the local location and any remote location in order to later use this information to separate the foreground from the background. Additionally, a correspondence between the surfaces of the different participating locations is obtained so that the surfaces can be white balanced and also displayed as a rectangle. Calibration of the RGB camera, the depth camera and the projector will be discussed in more detail later.

The color video of the local surface is then captured without visual echo, as shown in block 306. In one embodiment of the technique, the color video is captured with a color camera, e.g., a RGB camera such as a web camera. It should be noted that the local surface is also be captured with a depth camera which is used to determine changes in the location and orientation of the local surface, as well as the computation of the distance of objects from the surface, among other things.

The color video of the local surface is then separated into foreground and background, as shown in block 308 and the foreground video can optionally be white-balanced (e.g., the red, green and blue pixels in the foreground video can be scaled).

The foreground of the color video of the local surface, with or without white-balancing, is sent to at least one selected remote location, as shown in block 310. This can be done, for example, by sending the foreground of the local surface over a local network or over the Internet.

Once transferred, as shown in block 312, the foreground video of the local surface is projected onto the remote surface of the selected remote location to superimpose the foreground of the color video of the local surface onto the remote surface at the selected remote location.

A user at the selected remote location can also send color video of the corresponding remote surface back to the local location or to another remote location. For example, a user at a selected remote location can interact with the remote surface at the selected remote location. Video of a user interacting with the remote surface or objects on the remote surface at the selected remote location is captured without a visual echo of the projected foreground video of the local surface, as shown in block 314. Various methods can be used to remove the visual echo. In one embodiment, the visual echo of the local surface is eliminated by turning off the projected video of the local surface when capturing the color video of the selected remote surface.

The foreground and the background of the captured color video of the remote surface at the selected remote location is separated (as shown in block 316) and the foreground video of the selected remote surface is transmitted to the local location (as shown in block 318).

The foreground video of the selected remote surface is then projected onto the local surface at the local location to superimpose the remote surface, portions of a user and objects on the remote surface of the selected remote location onto the local surface at the local location, as shown in block 320.

It is also possible for the collaboration to be a three way, or greater, collaboration. In this case color video and corresponding depth camera video of each remote surface at each additional remote location is captured. The foreground and the background of the color video of the additional remote surfaces are separated and the foreground is transmitted to, for example, a previously selected remote location. The foreground video of the local surface and the foreground video of the additional remote surface are then projected onto the remote surface at the selected remote location to superimpose the foreground of the local surface and the foreground of the additional remote surface onto the remote surface at the selected remote location.

Figure 4:
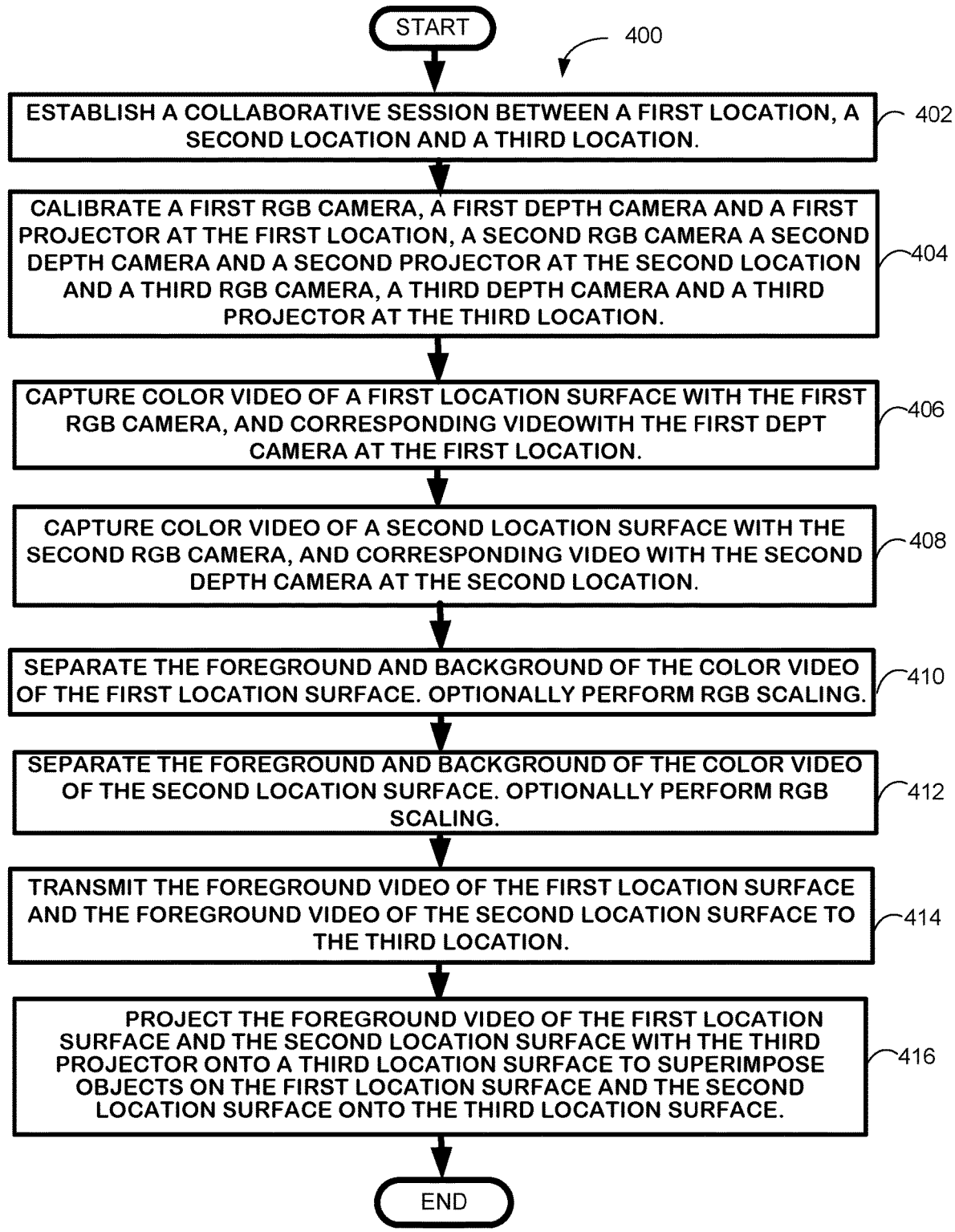
FIG. 4 depicts a flow diagram of another exemplary process for employing the interactive and shared surface technique described herein.

FIG. 4 shows another exemplary process 400 for practicing one embodiment of the interactive and shared surface technique where three locations share their surfaces as indicated above. As shown in block 402, a collaborative session is established between a first location, a second location and a third location. A RGB camera, a depth camera and projector are calibrated at each of the three locations, as shown in block 404. Color video of a first location surface is captured with the RGB camera, as is corresponding video with the depth camera at the first location (block 406). Likewise, color video of a second location surface is captured with the RGB camera as is corresponding video with the depth camera at the second location (block 408). The foreground and the background of the color video of the first and second surface are each separated (blocks 410, 412), and can optionally be white-balanced. The foregrounds are transmitted to the third location (block 414). The foreground video of the first location surface and second location surface are then projected with the projector at the third location onto the third location surface to superimpose objects from the first location surface and objects from the second location surface onto a third location surface at the third location, as shown in block 316.

1.4 Exemplary Scenario

Figure 5:
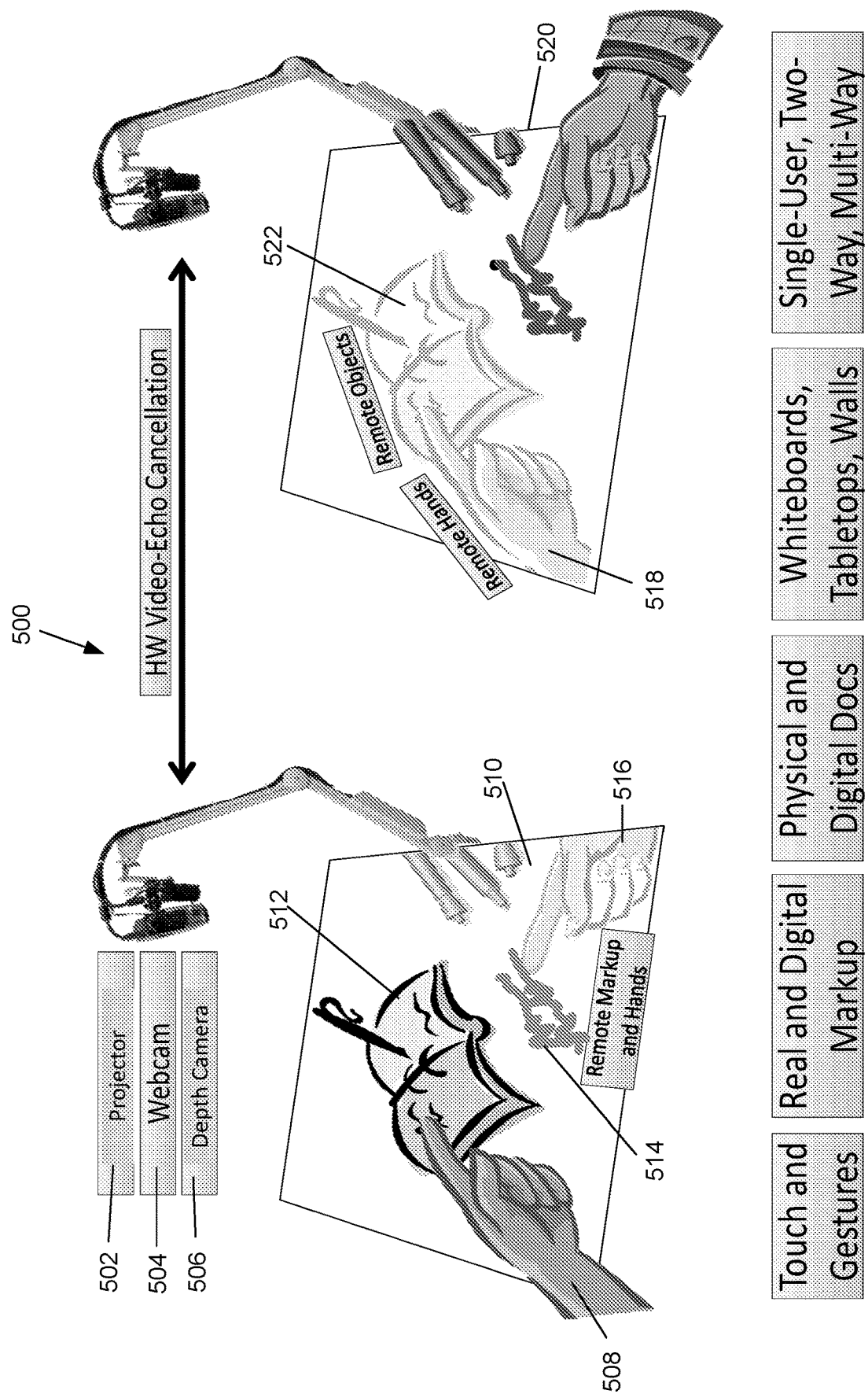
FIG. 5 depicts a schematic of an exemplary scenario for using the interactive and shared surface technique described herein.

FIG. 5 depicts an exemplary scenario 500 for practicing the interactive and shared surface technique embodiment described herein. As can be seen in FIG. 5, the hardware includes a projector 502, color camera 504 such as a RGB camera, and a depth camera 506 (for example, the depth camera can be one employed with Microsoft Corporation's Kinect™ controller). The hand of a user 508 at the first location surface 510 can be seen writing in a notebook 512 at the first location. Also shown are the projected markings 514 sent from a remote location surface 520 and a projected hand 516 from a remote user. Similarly, the remote location surface 520 shows the projected hand 518 of the user at the first location surface and projected remote object of the book 522.

1.5. Details of Various Exemplary Embodiments

The sections below provide details on the architectures and processes discussed above, as well as the aforementioned exemplary scenario.

1.5.1 Single-User and Multi-User Modes

The technique can be used in single-user and multi-user configurations as described below.

1.5.1.1 Single User Scenario

As mentioned previously, the interactive and shared surface technique can be used in a stand alone mode. For example, the technique can provide for an additional display for a desktop or laptop computer. Additionally the technique can be used in a stand-alone mode to capture data and then store, transmit or replay it. This capture capability is discussed in greater detail later in this specification.

The technique can also provide interaction with an application, such as, for example, an electronic presentation application. For instance, the hardware can project an electronic presentation and a user can page through the slides, make annotations on the slides of the presentation, and so forth, which can be captured and stored by the RGB camera. Or a file (e.g., a PDF file) can be projected on an arbitrary surface using the technique and a user can annotate the projected file. Annotations can be made in real or digital ink. These annotations can be captured just as ink or they can be converted into objects using the application. For instance, a ink mark of a circle can be turned into a circle object in a presentation application and the presentation file can be saved with the circle object.

1.5.1.2 Shared Scenarios

Besides single user scenarios, the technique can be employed is in a two way or in a multi-site (greater than two) collaboration as previously discussed.

In two-way collaborations, the technique establishes a collaborative session between the users' devices. It sends the video captured by the RGB camera of each user's surface to the projector on the other user's device which then displays the video on that user's surface. At this point, the local user can see and interact physically with a physical document on the remote user's surface (e.g., draw on it using real ink, point to it with hands, gesture to it with hands, etc.). Meanwhile, on the remote surface, the remote user can see a video of these interactions and perform physical interactions therewith as well.

In multi-way collaborations, the interactive surface sharing technique does not simply send the video captured by each user's RGB camera to all of the other users. This is because when videos from multiple remote users are projected, whichever video is projected last will be the visible one, as it will occlude all of the other videos. To solve this video occlusion problem, the technique composes videos from the remote users by separating the background from the foreground (e.g., hands, real ink, and physical objects) in each remote video and shows a composition of only the foregrounds.

1.5.2 Calibration

For the interactive and shared surface technique to properly capture and project the interactive surfaces, the RGB camera, the projector and the depth camera need to be calibrated.

1.5.2.1 Calibration of Projector, RGB Camera

In order for a local user's interactions to make sense on the remote user's surface, they must appear in the correct place and be of correct size on the remote user's surface. This requires that the projector and the RGB camera are calibrated. This is especially important as a hardware device (RGB camera, projector and depth camera) employed by the technique can be repositioned at the start of and during a shared session. Calibration is also needed for capture/scanning so that the locations of gestures of a user at a location can be properly computed.

In general, the RGB camera captures more than the projected area and also captures the projected area from arbitrary angles. However, only the area of the surface that coincides with the projected area is interactive and shared, so only the projected area is of interest. Therefore, it is desirable to correct the RGB camera's perspective and to zoom in on the projected area in order to track and transmit video of only the area of interest. This should be done once the projector location is set by the user during initialization. However, the result can be saved and reused across sessions if the hardware location/orientation is not changed.

One calibration approach that can be employed by the technique is to rely on users to perform the calibration manually. However, automatic approaches are also possible.

Figure 6:
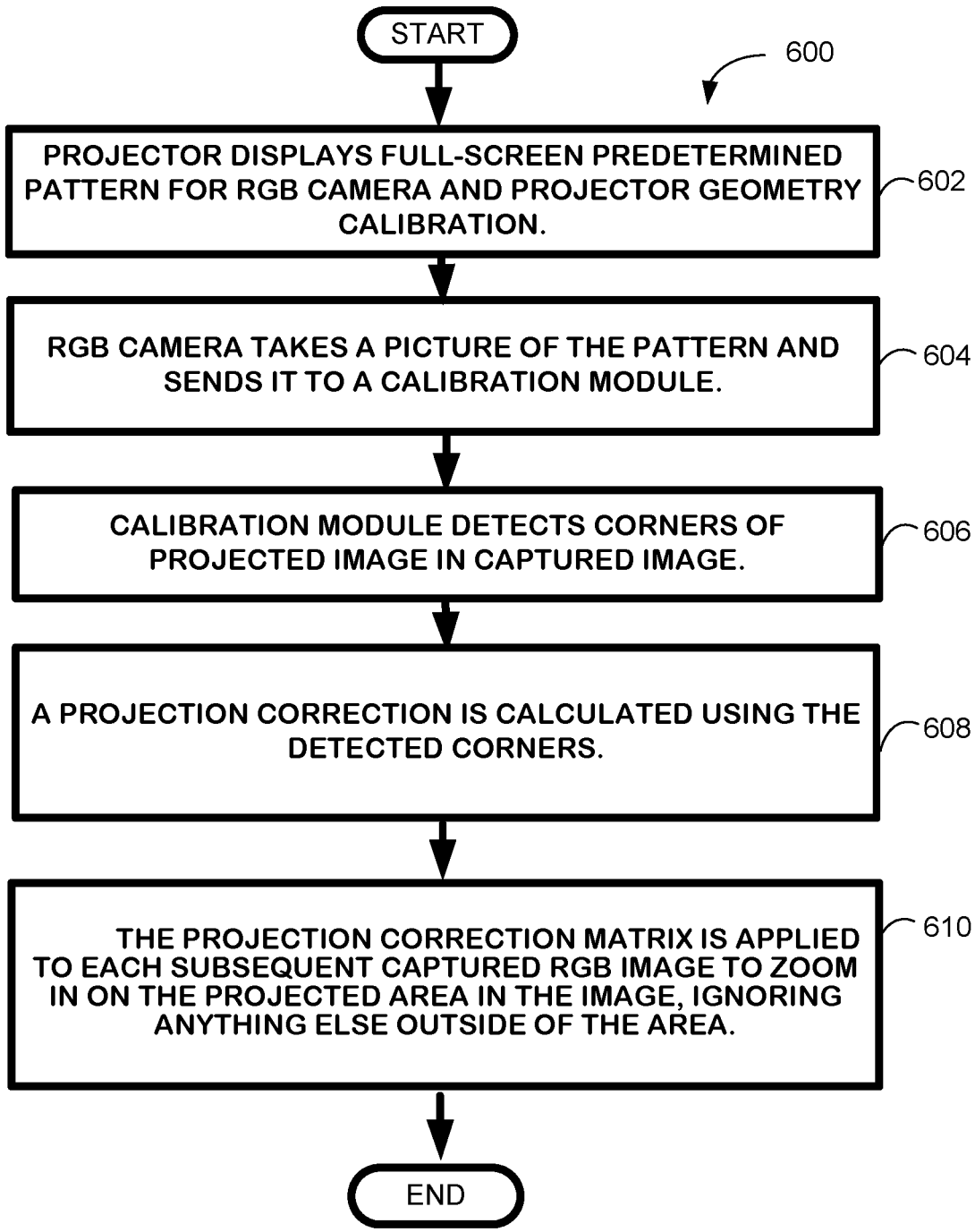
FIG. 6 depicts an exemplary flow diagram of a process for calibrating a RGB camera and projector used in one embodiment of the technique.

In one embodiment the technique automatically performs the calibration between the projector and the RGB camera by projecting well known patterns onto the surface and based on the images the camera captures for these patterns, calibrating the projector and RGB camera. More specifically, as shown in FIG. 6, block 602, the projector displays a full-screen predetermined pattern for RGB and projector geometry calibration onto the surface. The RGB camera takes an image of the pattern and sends it to a calibration module, as shown in block 604. The calibration module detects the corners of the projected image in the captured image (block 606) and a projection correction matrix is calculated using the projected corners (block 608). The projection correction matrix is then applied to each subsequent captured image to zoom in on the projected area in the image, ignoring everything else outside of the area, as shown in block 610.

During run time, when the depth camera detects a sudden change in surface depth characteristics (above a certain threshold), the RGB camera and projector calibration is repeated and a new projection matrix is applied to each subsequently captured RGB image to zoom in on the projected area of an image and ignore everything else outside the projected area.

With the depth camera it is also possible to entirely automate the process of composing a new projection matrix. In this embodiment, the relative position of the RGB camera and projector is known, as are the focal lengths. Because the depth camera can determine the distance and angle to the projection surface, it is possible to locate all devices of the hardware (e.g., RGB camera, depth camera, projector) in three dimensions and thus apply the necessary transformations to project correctly. This can be done in a continuous fashion, i.e., as the hardware is moved the calibration matrix updates accordingly.

1.5.2.2 Calibration of the Depth Camera and Projector

For touch and gesture detection to be accurate, the depth camera and the projector must be calibrated. The depth camera captures more than the projected area and captures the projected area from arbitrary angles. Only the area of the surface that coincides with the projected area is interactive and shared, thus it is necessary to correct the depth camera perspective and to zoom in only on the area of interest. This should be done once the projector location is set by the user during initialization. The result can be saved and reused across sessions if the hardware location and orientation is not changed.

Figure 7:
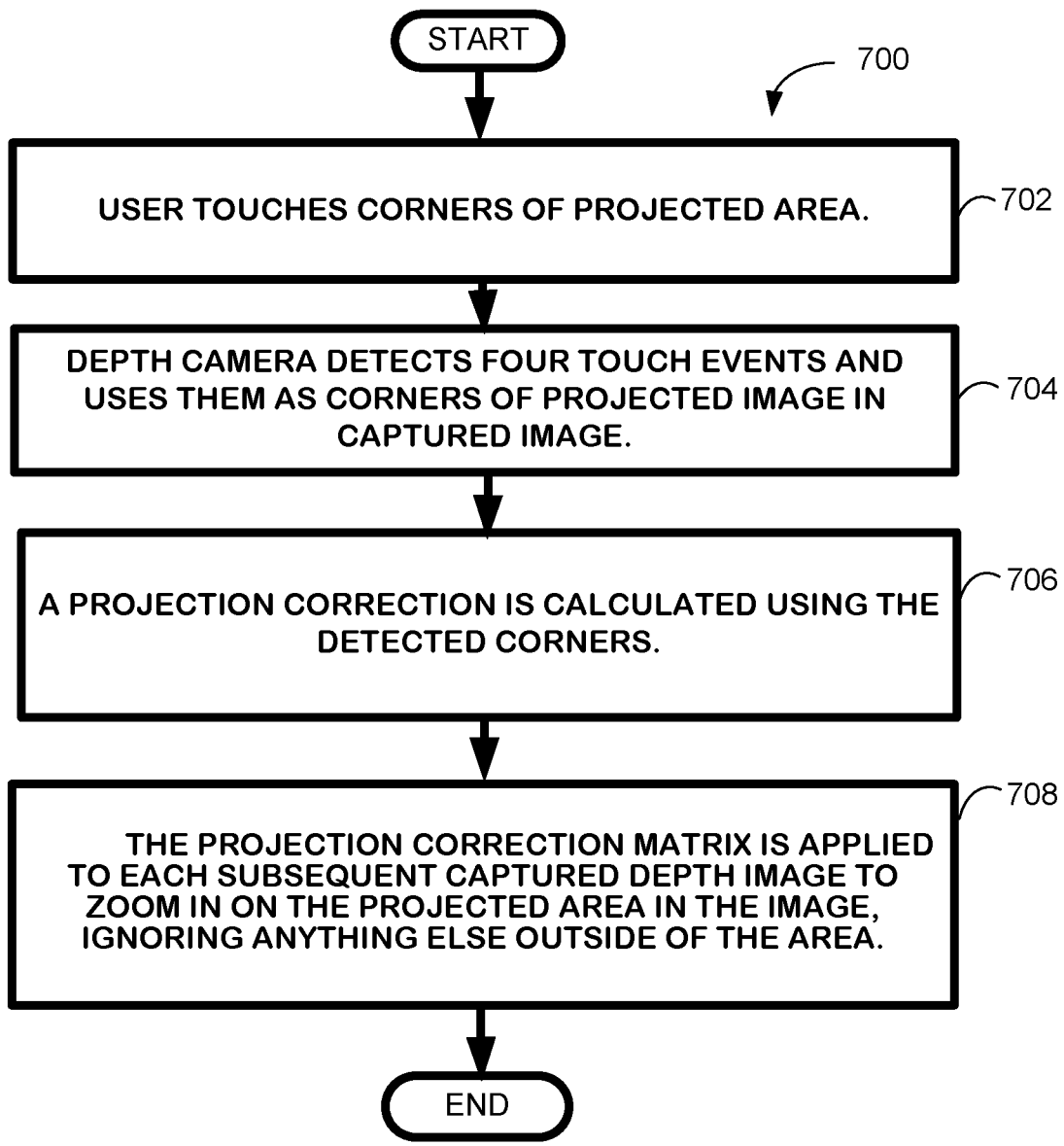
FIG. 7 depicts an exemplary flow diagram of a process for calibrating a depth camera and projector used in one embodiment of the technique.

More specifically to calibrate the depth camera and projector, as shown in FIG. 7, block 702, a user touches the corners of the area projected by the projector with their finger (or with special IR markers or simple non-IR markers). The depth camera detects the four touch events/markers and uses them to define the corners of the projected image in the captured image (block 706) and a projection matrix is calculated using the detected corners (block 708). The projection correction matrix is then applied to each subsequent captured depth image to zoom in on the projected area in the image, ignoring everything else outside of the area.

It should be noted that just like the technique can use the depth camera information to calibrate the RGB camera and projector, the technique can also use the RGB camera and projector calibration to calibrate the depth camera. In this approach, first the technique calibrates the RGB camera and the projector. Then, if the relative locations and parameters of the RGB and depth camera are known, the technique can calibrate the depth camera using the RGB camera calibration data.

When the depth camera detects a sudden change in surface depth characteristics (above a certain threshold), the RGB camera and projector calibration is repeated and a new projection matrix is applied to each subsequently captured RGB image to zoom in on the projected area of an image and ignore everything else outside the projected area.

The depth camera and projector calibration mechanism is able to distinguish between changes in surface and changes of angle between the depth camera and a surface. As a result, the technique interprets any moves of the device by the users that do not change the surface at which the device is pointing as an interaction with the surface. For instance, moving the device closer to the surface zooms in on a digital object being displayed. In addition, moving the head of the device around shows different viewpoints of any digital object being displayed. Therefore, users can have a pseudo 3D view of the object.

1.5.3 Foreground/Background Segmentation

During calibration, in one embodiment, the technique determines a baseline RGB image that is subtracted from each RGB image before it is transmitted. In one embodiment this is done by capturing ten RGB images of the initial surface and for each pixel calculating the average R, G, B values of the captured images. These average R, G, B values for each pixel are stored in a baseline image representing the background.

In one embodiment of the technique the foreground and the background of the video of a surface are separated by comparing red, green and blue values for each pixel in a captured frame of the video of the local surface to a corresponding pixel captured in the baseline image captured during calibration. If the difference in red or green or blue value is above a prescribed threshold, that pixel is considered as foreground. Otherwise the pixel is considered as background.

In another embodiment of the technique the foreground and the background of the video of a surface are separated by comparing red, green and blue values for each pixel in a captured frame of the video of the surface to a corresponding pixel in the baseline image of the surface. If the difference in red or green or blue value is low, a low transparency value is assigned to that pixel and that pixel is considered as foreground. If the difference in the red or green or blue value is high that pixel is considered as background and a high transparency value is assigned to this pixel. A value between 0 and 1 inclusively is assigned to each pixel based on how far R G and B value is from the baseline.

1.5.4 RGB Scaling

In one embodiment the technique performs RGB scaling in order to white-balance captured video frames. Any conventional RGB scaling technique can be used. However, in one embodiment the technique performs RGB scaling as follows. The technique captures ten RGB video frames. For each pixel, the technique calculates average R, G and B values for the captured images. For each pixel, and for each R, G, B value, a multiplier (scaling factor) is calculated that would bring the value to 255. These scaling values are stored in a RGB scaling matrix which applied to subsequent video frames to provide white-balancing.

1.5.5 Detailed Sender Side Processing

Figure 8:
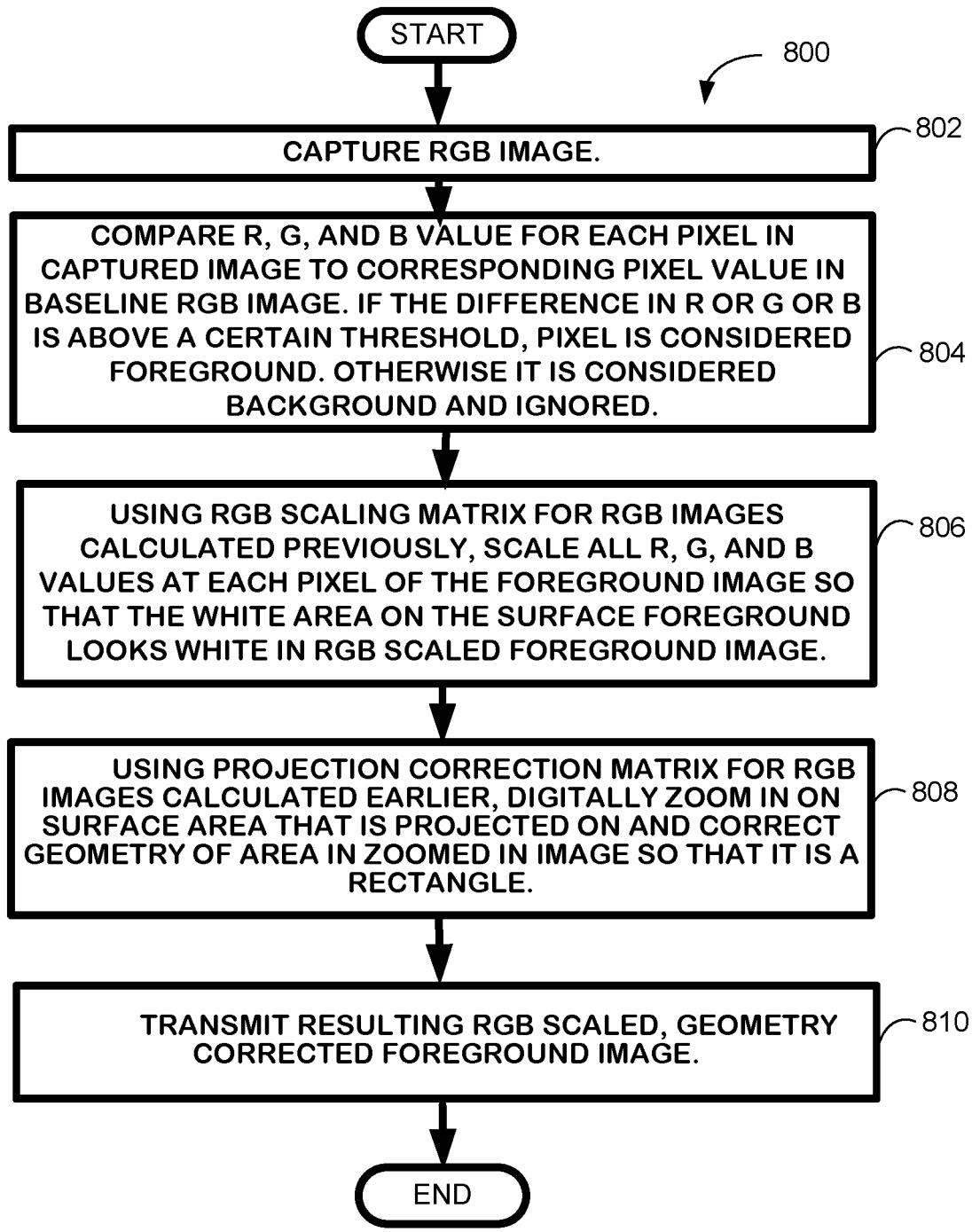
FIG. 8 depicts an exemplary flow diagram of sender side processing employed in one embodiment of the interactive and shared surface technique.

To clarify the use of the baseline image and the projection and RGB scaling matrices, an example is useful. In one embodiment 800 of the interactive surface sharing technique described herein, detailed sender side processing 800 is as follows. As shown in FIG. 8, block 802, a RGB image is captured. The R,G,B value for each pixel in the captured image is compared to a corresponding pixel value in the baseline RGB image and if the difference in R or G or B is above a certain threshold that pixel is considered as foreground, otherwise it is considered as background and ignored (block 804). Using the previously determined white-balancing RGB scaling matrix for RGB images, all R, G, and B values at each pixel of the foreground image are scaled so that the white area on the surface looks white in the RBG scaled foreground image (block 806). Using the projection matrix for RGB images calculated earlier, the surface area that is projected on is digitally zoomed in on and the geometry of the area in the zoomed in image is corrected so that it is a rectangle, as shown in block 808. The resulting RGB scaled, geometry corrected foreground image is then transmitted (as shown in block 810). At the receiving side, the RGB scaled geometry corrected foreground image is projected on the surface.

Figure 9:
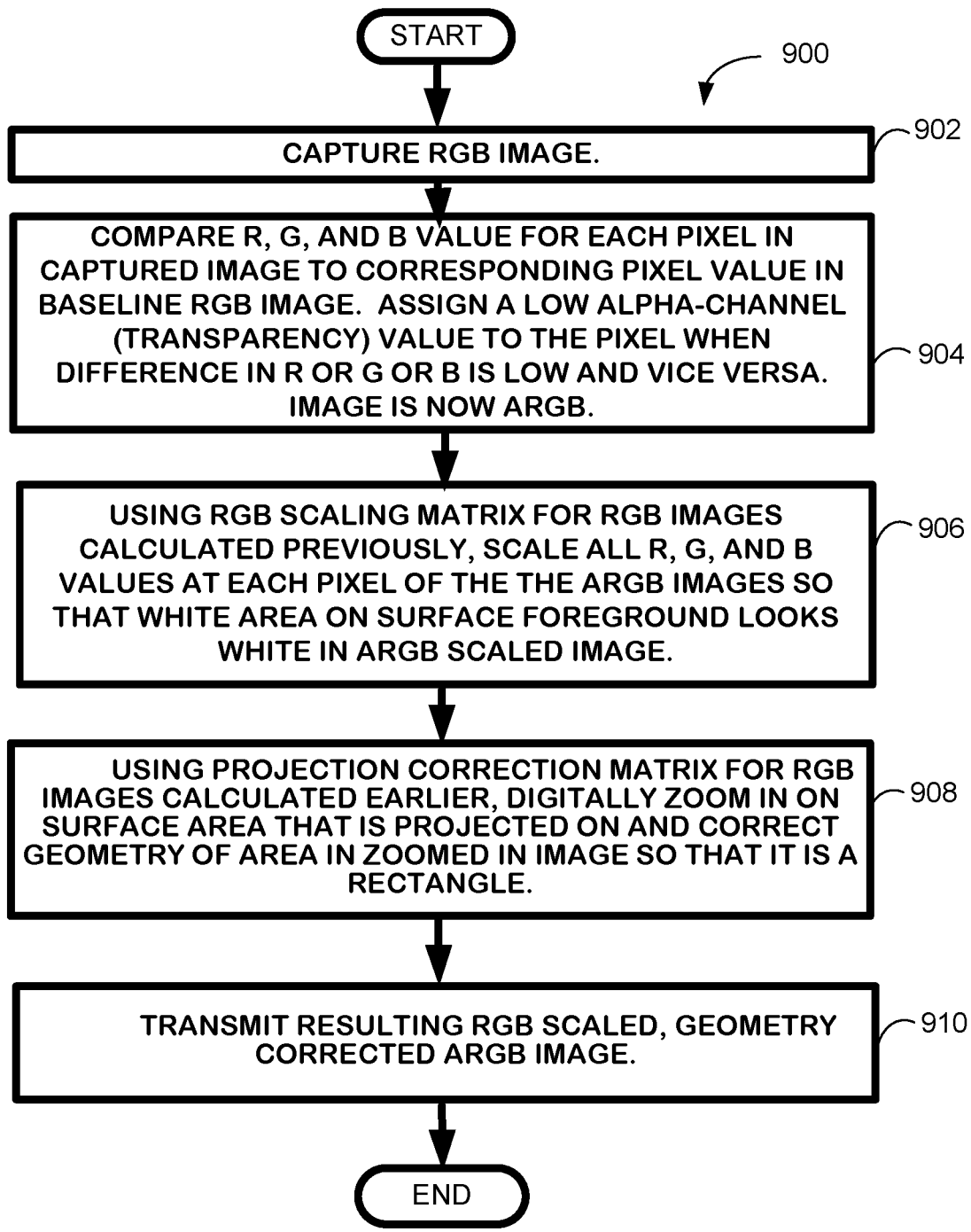
FIG. 9 depicts an exemplary flow diagram of sender side processing employed in another embodiment of the interactive and shared surface technique.

Another embodiment of detailed sender side processing 900 is depicted in FIG. 9 and is as follows. As shown in FIG. 9, block 902, a RGB image is captured. The R,G,B value for each pixel in the captured image is compared to a corresponding pixel value in the baseline RGB image and a low alpha-channel (transparency) value is assigned to the pixel when the difference in R or G or B is low and vice-versa, thereby creating an alpha RGB (ARGB) image (block 904). Using a previously determined white-balancing RGB scaling matrix for RGB images, all R, G, and B values at each pixel of the ARGB image are scaled so that the white area on the surface foreground looks white in the ARGB scaled image (block 906). Using the projection matrix for RGB images calculated earlier, the surface area that is projected on is digitally zoomed in on and the geometry of the area in the zoomed in image is corrected so that it is a rectangle, as shown in block 908. The resulting RGB scaled, geometry corrected ARGB image is then transmitted (as shown in block 910). At the receiving side, the RGB scaled, geometry corrected ARGB image is projected on the surface.

1.5.6 Sharing Digital Documents and Objects

When users share digital documents using the interactive and shared surface technique, video occlusion is an issue not just in multi-way, but also two-way scenarios. If the technique were to simply display the video received from a remote user's RGB camera on the local surface, the video would cover the digital document. As a result, when sharing digital documents, background is determined as discussed previously and is stripped from videos coming from remote users regardless of whether a two-way or multi-way session is taking place.

When digital objects are being shared, users can continue to perform physical interactions on them such as pointing and drawing with real ink. In addition, they can perform digital interactions with the surface. The technique uses the depth camera information to deduce when users touch the surface and objects on or above the surface.

In addition to detecting discrete touch events based on the depth camera images, the technique also detects gestures. Multi-touch gestures are supported, including flicking, pinching and unpinching, and others. The technique supports both touch gestures on the surface and hover gestures above the surface. For instance, a user can flick through an electronic presentation by making flicking gestures on the surface. The number of hover levels above the surface can be more than one, although from the usability point of view, one hover level is perhaps ideal.

1.5.7 Capture of a Surface and Above Surface

In all of the above scenarios, users are able to capture whatever they see. As a result, the technique supports capture of a collaboratively created drawing, where the capture would include both local and remote users' markup and annotations.

The capture functionality can also be used in a standalone manner. The technique can act as a scanner as a user can place a physical document on a surface, capture it with the RGB camera, and as a result, have a digital image of the document equivalent to one produced by a scanner. The technique can be used to project a digital document on an arbitrary surface and a user can mark up the digital document on the surface with annotations, a signature or the like. The user can capture the local surface with the projected annotations and save it as a digital image of the document equivalent to one produced by a scanner.

One embodiment of the technique also allows a user to fill in a form downloaded form some source, such as the World Wide Web, for example, and to project this onto an arbitrary surface. A user can then fill in the projected form using actual or digital ink and capture the filled in form to memorialize it.

Capture of the surface can also include activating a capture function by projecting a control onto the surface and then activating the control by gesturing or touching the surface. For example, a projected document can be displayed on to the surface. A user draws on the projected document with real or digital ink and then gestures to activate a capture function. The projected document is then captured by the RGB camera to create a new electronic document containing the original projected document with an image of the user's drawing superimposed on it.

1.5.8 Audio Gestures/Commands

Moreover, in all of the above scenarios, users can use audio gestures/commands. For instance, a user can utter the phrase "<DEVICE NAME HERE> Capture" to perform a capture operation. Audio can be captured using the computer microphone (or possibly using the microphone array incorporated into the device).

1.5.9 Interaction Between Physical and Digital Objects

Another feature of some embodiments of the technique is to support interaction between physical and digital objects. For instance, one embodiment of the technique is employed in a game in which a digital beam of light is projected and users can cause reflections and refractions of the digital light beam by placing physical mirrors and prism objects on the surface. Another such scenario is to allow children to place a physical toy train track on the surface and then see virtual toy trains moving around the track. If a physical toy car is placed next to the train track, then whenever the train goes by the car, the train whistles. To do this the technique uses the RGB or depth video, or both videos, to determine the locations of the physical objects. The determined locations are then translated into the digital world and a proxy digital object is used to replace the real object there. Then, the other digital objects can interact with proxy digital objects, just as if the real object were actually in the digital world. Thus, the train can blow its whistle when it goes by the (digital proxy for the) physical car.

2.0 Exemplary Operating Environments:

The interactive and shared surface technique described herein is operational within numerous types of general purpose or special purpose computing system environments or configurations. FIG. 10 illustrates a simplified example of a general-purpose computer system on which various embodiments and elements of the interactive and shared surface technique, as described herein, may be implemented. It should be noted that any boxes that are represented by broken or dashed lines in FIG. 10 represent alternate embodiments of the simplified computing device, and that any or all of these alternate embodiments, as described below, may be used in combination with other alternate embodiments that are described throughout this document.

Figure 10:
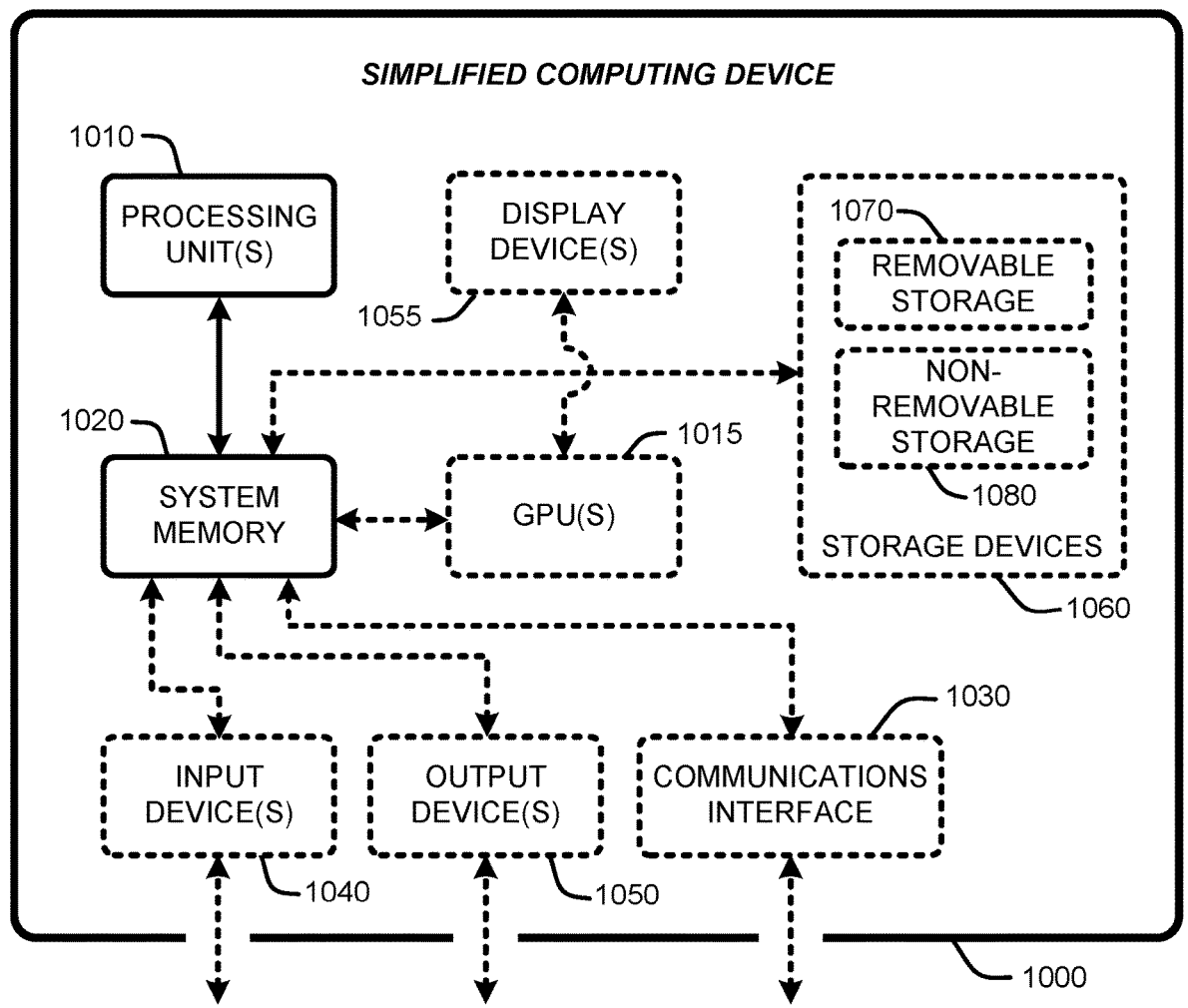
FIG. 10 is a schematic of an exemplary computing environment which can be used to practice the interactive and shared surface technique.

For example, FIG. 10 shows a general system diagram showing a simplified computing device 1000. Such computing devices can be typically found in devices having at least some minimum computational capability, including, but not limited to, personal computers, server computers, hand-held computing devices, laptop or mobile computers, communications devices such as cell phones and PDA's, multiprocessor systems, microprocessor-based systems, set top boxes, programmable consumer electronics, network PCs, minicomputers, mainframe computers, audio or video media players, etc.

To allow a device to implement the interactive and shared surface technique, the device should have a sufficient computational capability and system memory to enable basic computational operations. In particular, as illustrated by FIG. 10, the computational capability is generally illustrated by one or more processing unit(s) 1010, and may also include one or more GPUs 1015, either or both in communication with system memory 1020. Note that that the processing unit(s) 1010 of the general computing device of may be specialized microprocessors, such as a DSP, a VLIW, or other micro-controller, or can be conventional CPUs having one or more processing cores, including specialized GPU-based cores in a multi-core CPU.

In addition, the simplified computing device of FIG. 10 may also include other components, such as, for example, a communications interface 1030. The simplified computing device of FIG. 10 may also include one or more conventional computer input devices 1040 (e.g., pointing devices, keyboards, audio input devices, video input devices, haptic input devices, devices for receiving wired or wireless data transmissions, etc.). The simplified computing device of FIG. 10 may also include other optional components, such as, for example, one or more conventional computer output devices 1050 (e.g., display device(s) 1055, audio output devices, video output devices, devices for transmitting wired or wireless data transmissions, etc.). Note that typical communications interfaces 1030, input devices 1040, output devices 1050, and storage devices 1060 for general-purpose computers are well known to those skilled in the art, and will not be described in detail herein.

The simplified computing device of FIG. 10 may also include a variety of computer readable media. Computer readable media can be any available media that can be accessed by computer 1000 via storage devices 1060 and includes both volatile and nonvolatile media that is either removable 1070 and/or non-removable 1080, for storage of information such as computer-readable or computer-executable instructions, data structures, program modules, or other data. By way of example, and not limitation, computer readable media may comprise computer storage media and communication media. Computer storage media includes, but is not limited to, computer or machine readable media or storage devices such as DVD's, CD's, floppy disks, tape drives, hard drives, optical drives, solid state memory devices, RAM, ROM, EEPROM, flash memory or other memory technology, magnetic cassettes, magnetic tapes, magnetic disk storage, or other magnetic storage devices, or any other device which can be used to store the desired information and which can be accessed by one or more computing devices.

Storage of information such as computer-readable or computer-executable instructions, data structures, program modules, etc., can also be accomplished by using any of a variety of the aforementioned communication media to encode one or more modulated data signals or carrier waves, or other transport mechanisms or communications protocols, and includes any wired or wireless information delivery mechanism. Note that the terms "modulated data signal" or "carrier wave" generally refer a signal that has one or more of its characteristics set or changed in such a manner as to encode information in the signal. For example, communication media includes wired media such as a wired network or direct-wired connection carrying one or more modulated data signals, and wireless media such as acoustic, RF, infrared, laser, and other wireless media for transmitting and/or receiving one or more modulated data signals or carrier waves. Combinations of the any of the above should also be included within the scope of communication media.

Further, software, programs, and/or computer program products embodying the some or all of the various embodiments of the interactive and shared surface technique described herein, or portions thereof, may be stored, received, transmitted, or read from any desired combination of computer or machine readable media or storage devices and communication media in the form of computer executable instructions or other data structures.

Finally, the interactive and shared surface technique described herein may be further described in the general context of computer-executable instructions, such as program modules, being executed by a computing device. Generally, program modules include routines, programs, objects, components, data structures, etc., that perform particular tasks or implement particular abstract data types. The embodiments described herein may also be practiced in distributed computing environments where tasks are performed by one or more remote processing devices, or within a cloud of one or more devices, that are linked through one or more communications networks. In a distributed computing environment, program modules may be located in both local and remote computer storage media including media storage devices. Still further, the aforementioned instructions may be implemented, in part or in whole, as hardware logic circuits, which may or may not include a processor.

It should also be noted that any or all of the aforementioned alternate embodiments described herein may be used in any combination desired to form additional hybrid embodiments. Although the subject matter has been described in language specific to structural features and/or methodological acts, it is to be understood that the subject matter defined in the appended claims is not necessarily limited to the specific features or acts described above. The specific features and acts described above are disclosed as example forms of implementing the claims.

What is claimed is:

1. A system for sharing content on arbitrary surfaces, comprising:
    a processor; and
    a memory storing instructions that, when executed by the processor, cause the system to perform a set of operations, the set of operations comprising:
        causing one or more annotations that were captured at a remote location to be projected onto a first arbitrary surface;
        capturing a first image of the first arbitrary surface without visual echo, the first image capturing one or more physical objects positioned on or above the first arbitrary surface, and the visual echo being eliminated by turning off the projection onto the first arbitrary surface when the first image is captured;
        separating a foreground from a background of the first image, based on a comparison of the first image to a baseline image of the first arbitrary surface, the foreground comprising the one or more physical objects and the background comprising the first arbitrary surface; and
        sending the foreground of the first image to a projector for projecting the foreground of the first image without projection of the background onto a second arbitrary surface at the remote location.

2. The system of claim 1, further comprising receiving, from a second camera, a second image comprising a second set of physical objects on the second arbitrary surface.

3. The system of claim 2, wherein the one or more physical objects is a first set of physical objects, and the one or more annotations are projected with one or more objects of the second set of physical objects.

4. The system of claim 1, wherein the first image is captured during manipulation of a projected object or the one or more physical objects.

5. The system of claim 1, wherein the one or more annotations are projected with a set of one or more digital objects.

6. The system of claim 1, wherein further comprising: the first image is captured contemporaneously with projecting the first image onto the second arbitrary surface.

7. The system of claim 1, wherein the second arbitrary surface is remote from the first arbitrary surface.

8. The system of claim 1, wherein the foreground of the first image is sent for projection on the second arbitrary surface over a network.

9. A system for sharing content on arbitrary surfaces, comprising:
    a processor; and
    a memory storing instructions that, when executed by the processor, cause the system to perform a set of operations, the set of operation comprising:
        projecting one or more objects onto a first arbitrary surface, the first arbitrary surface further comprising one or more physical objects;
        capturing an image comprising one or more of the projected objects and one or more of the physical objects on the first arbitrary surface, the image being captured without visual echo from the projection of objects on the first arbitrary surface, and the visual echo being eliminated by turning off the projected one or more objects projected onto the arbitrary surface when the image is captured;
        separating a foreground from a background of the image, based on a comparison of the first image to a baseline image of the first arbitrary surface, the foreground comprising the one or more physical objects and the background comprising the first arbitrary surface; and
        sending the foreground of the image for projection on to a second arbitrary surface without projection of the background.

10. The system of claim 9 wherein the image is captured during manipulation of any of the projected objects and physical objects.

11. A computer-implemented method comprising:
    causing one or more annotations that were captured at a remote location to be projected onto a first arbitrary surface;
    capturing a first image of the first arbitrary surface without visual echo, the first image capturing one or more physical objects positioned on or above the first arbitrary surface, and the visual echo being eliminated by turning off the projection onto the first arbitrary surface when the first image is captured;
    separating a foreground from a background of the first image, based on a comparison of the first image to a baseline image of the first arbitrary surface, the foreground comprising the one or more physical objects and the background comprising the first arbitrary surface; and
    sending the foreground of the first image to a projector for projecting the foreground of the first image onto a second arbitrary surface.

12. The method of claim 11, wherein the first image is captured with a visual light camera and a depth camera.

13. The method of claim 12, further comprising using the depth camera to determine where a user or an object is located relative to the first arbitrary surface.

14. The method of claim 12, wherein the depth camera is used to determine a user's hand relative to the first arbitrary surface and wherein the user's hand location is used to manipulate a projected object on the arbitrary surface by touch or gesture.

15. The method of claim 11, further comprising receiving, from a second camera, a second image comprising a second set of physical objects on the second arbitrary surface.

16. The method of claim 15, wherein the one or more physical objects is a first set of physical objects, and the one or more annotations are projected with one or more objects of the second set of physical objects.

17. The method of claim 11, wherein the first image is captured during manipulation of a projected object or the one or more physical objects.

18. The method of claim 11, wherein the one or more annotations are projected with a set of one or more digital objects.

19. The system of claim 9, further comprising a visual light camera and a depth camera, wherein the image is captured with the visual light camera and the depth camera.

20. The system of claim 9, wherein the second arbitrary surface is remote from the first arbitrary surface, and wherein the foreground of the image is sent for projection onto the second arbitrary surface over a network.

* * * * *